United States Patent [19]
Miyazaki

[11] Patent Number: 6,109,793
[45] Date of Patent: Aug. 29, 2000

[54] ROLLING BEARING UNIT WITH ROTATIONAL SPEED SENSOR

[75] Inventor: Hiroya Miyazaki, Fujisawa, Japan

[73] Assignee: NSK Ltd., Tokyo, Japan

[21] Appl. No.: 09/032,562

[22] Filed: Feb. 27, 1998

[30] Foreign Application Priority Data

Jun. 27, 1997 [JP] Japan ................................ 9-172218

[51] Int. Cl.⁷ .................................................. F16C 19/08
[52] U.S. Cl. ......................................................... 384/448
[58] Field of Search ................................... 384/448, 446; 324/173, 174, 537, 513

[56] References Cited

U.S. PATENT DOCUMENTS

| | | |
|---|---|---|
| 3,719,841 | 3/1973 | Ritsema . |
| 4,778,286 | 10/1988 | Kadokawa . |
| 5,183,341 | 2/1993 | Ouchi et al. . |
| 5,214,722 | 5/1993 | Faye et al. . |
| 5,624,192 | 4/1997 | Rigaux et al. . |

FOREIGN PATENT DOCUMENTS

| | | |
|---|---|---|
| 0 426 298 | 5/1991 | European Pat. Off. . |
| 0 484 661 | 5/1992 | European Pat. Off. . |
| 0 667 530 | 8/1995 | European Pat. Off. . |
| 1-156464 | 10/1989 | Japan . |
| 3-115215 | 11/1991 | Japan . |
| 4-61060 | 5/1992 | Japan . |
| 4-61061 | 5/1992 | Japan . |

OTHER PUBLICATIONS

KOYO Engineering Journal, Mar. 1997, pp. 33–39, No. 151. Japan.

*Primary Examiner*—Lenard A. Footland
*Attorney, Agent, or Firm*—Evenson, McKeown, Edwards & Lenahan, P.L.L.C.

[57] ABSTRACT

A rolling bearing unit with a rotating speed sensor includes a stationary double row outer ring having a mount hole in an axially intermediate portion thereof, a rotatable inner ring assembly having a first inner ring having a first inner ring raceway and a second inner ring having a second inner ring raceway, and a plurality of rolling members provided between the first and second inner ring raceways and the outer ring raceways to provide a ball set bore diameter, respectively. An encoder has a detected portion with characteristics which change alternately and with a uniform interval in a circumferential direction, and is fixed concentric, at a portion on the inner ring assembly, axially between the first and second inner ring raceways. The detected portion has an outer peripheral surface portion with a diameter up to the ball set bore diameter. A sensor is provided for producing an output signal, has a detecting portion, and is supported within the mount hole in a state in which the detecting portion is opposed to the outer peripheral surface portion of the detected portion of the encoder. As a result, the output signal of the sensor changes as the characteristics of the detected portion alternately change.

2 Claims, 9 Drawing Sheets

ROLLING BEARING UNIT WITH ROTATIONAL SPEED SENSOR

FIELD OF THE INVENTION

The present invention is related to a rolling bearing unit fitted with a rotational speed sensor (referred to hereunder as a speed sensing rolling bearing unit) which is used for rotatably supporting a road wheel of a vehicle relative to a suspension unit, and for sensing the rotational speed of the wheel.

DESCRIPTION OF RELATED ART

Rolling bearing units are used for rotatably supporting a road wheel of a vehicle on a suspension unit. Moreover, in order to control an anti-lock braking system (ABS) or a traction control system (TCS), it is necessary to sense the rotational speed of the wheel. Therefore, a speed sensing rolling bearing unit having a rotational speed sensor incorporated into the rolling bearing unit has become widely accepted to rotatably support the wheel of a vehicle relative to the suspension unit while sensing the rotational speed of the wheel.

FIG. 9 shows a device as disclosed in Japanese Unexamined Patent Publication TOKUKAI SHO No. 62-249069 which is one example of a conventional construction for a rotational speed sensor used for this purpose. This speed sensing rolling bearing unit has an outer ring 1, which does not to rotate during use and which has a sensor 5. The unit also has a first inner ring, specifically hub 2, and a second inner ring, specifically inner ring 3, which are both rotatably supported inside the outer ring 1 to rotate during use. An encoder 4 is fixed to an outer peripheral surface of an axially central portion of the hub 2 and a sensor 5 is supported on the outer ring 1 so that the rotational speed of the encoder 4 is detected by the sensor 5. The inner ring 3, when externally secured to the hub 2, constitutes an inner ring assembly 7 together with the hub 2. More specifically, outer ring raceways 6 are provided in double rows on the inner peripheral surface of the outer ring 1, and inner ring raceways 8 are respectively provided on the outer peripheral surface of the hub 2 and the inner ring 3. A plurality of rolling members 9 are retained by respective cages 10 and rotatably provided between the inner ring raceways 8 and the outer ring raceways 6, so that the inner ring assembly 7 is rotatably supported inside the outer ring 1.

A flange 11 for wheel attachment is provided on an axially outer end portion (the portion which is on the outside in the widthwise direction when assembled to a vehicle; this is the left end portion in FIG. 9) of the hub 2 which protrudes axially from the axially outer end portion of the outer ring 1.

Furthermore, an attachment portion 12 for connecting the outer ring 1 to a suspension unit (not shown) is provided on the outer peripheral surface of an axially central portion of the outer ring 1. Gaps between the open portions at the opposite ends of the outer ring 1 and the outer peripheral surface of the axially central portion of the hub 2 and the axially inner end portion of the inner ring 3 (the end portion which becomes the widthwise central side when assembled to a vehicle; this is the right end portion in FIG. 9) are covered by respective seal rings 13.

In the example shown in the figures, balls are used for the rolling members 9. However, in the case of rolling bearing units for heavy vehicles, tapered rollers may be used for the rolling members.

In order to assemble the abovementioned speed sensing rolling bearing unit, the encoder 4 is externally secured to a portion between the pair of inner ring raceways 8 on the outer peripheral surface of the axially central portion of the hub 2. The encoder 4 is formed in an annular shape from a magnetic material such as carbon steel, and is made generally in a gear tooth form by forming circumferentially consecutive recesses and protrusions in the outer peripheral rim portion, so that the magnetic characteristics of the outer peripheral rim portion change alternately and at even spacing in the circumferential direction. The encoder 4 is secured to the hub 2 by an interference fitting over the central portion of the hub 2.

A mounting hole 14 for communicating between the inner and outer peripheral surfaces of the outer ring 1 is formed at an axially central portion of the outer ring 1 at a location radially outward from the encoder 4. The sensor 5 is inserted and secured inside the mounting hole 14 so that a detecting portion provided on a tip end face (lower end face in FIG. 9) of the sensor 5 faces the outer peripheral surface of the encoder 4 across a small gap.

In the abovementioned speed sensing rolling bearing unit, a road wheel (not shown) secured to the flange 11 provided on the axially outer end portion of the hub 2 is rotatably supported relative to the suspension unit which supports the outer ring 1. Furthermore, when the encoder 4 which is externally secured to the central portion of the hub 2 rotates together with the rotation of the wheel, the recesses and protrusions provided in the outer peripheral rim portion of the encoder 4 alternately pass near the detecting portion provided on the tip end face of the sensor 5. As a result, the density of the magnetic flux flowing in the sensor 5 changes so that the output from the sensor 5 changes. The frequency with which the output from the sensor 5 changes is proportional to the rotational speed of the road wheel. Consequently, if the output from the sensor 5 is sent to a control unit (not shown in the figure), then an ABS or TCS can be appropriately controlled.

In the speed sensing rolling bearing unit constructed as described above, however, the assembly operation can be troublesome, making it difficult to minimize cost while also maintaining quality. The reason for this is that once the respective rolling members 9 and cages 10 have been assembled inside the double row outer ring raceways 6 provided on the inner peripheral surface of the outer ring 1, the encoder4 cannot be fitted between the double row rolling members 9.

That is to say, with the current assembly method generally carried out on rolling bearing units, after the respective rolling members 9 and cages 10 and a seal 13 (left side in FIG. 9) have been assembled inside the double row outer ring raceways 6 provided on the inner peripheral surface of the outer ring 1, the hub 2 and the inner ring 3 are assembled inside the respective rolling members 9 through the bore diameter of the rolling member set. It is desirable to apply this conventional step to the hub 2 with the encoder 4 externally secured thereto, and assemble this hub 2 with the encoder 4 inside the outer ring 1. However, in the case of the conventional speed sensing rolling bearing unit shown in FIG. 9, the outer diameter of the encoder 4 is greater than the bore diameter of the rolling member set, that is the diameter of the inscribing circle of the plurality of rolling members 9 provided inside the respective outer ring raceways 6. Therefore, the encoder 4 cannot pass inside the plurality of rolling members 9, and hence the assembly operation is not possible by the abovementioned conventional process.

Therefore, in the case of assembly of the conventional construction shown in FIG. 9, once the hub 2 has been fitted inside the outer ring 1 with the rolling members 9 and a seal 13 installed on one side only (left side in FIG. 9), then prior to installing the other side rolling members (right side in FIG. 9) and the inner ring 3, it is necessary to externally secure the encoder 4 to the outer peripheral surface of the axially central portion of the hub 2. In this condition, the central portion of the hub 2 is positioned at a location deep inside the cylindrical space 15 between the inner peripheral surface of the outer ring 1 and the outer peripheral surface of the hub 2, and hence the operation of externally securing the encoder 4 is difficult. Therefore, if care is not taken in this external securing operation, the attachment position of the encoder 4 can be incorrect, and it is likely that accurate rotational speed sensing will not be achieved.

A construction resembling that of FIG. 9 is also disclosed in FIG. 5 on page 35 of Koyo Engineering Journal No. 151, published in March 1997 by Koyo Seiko Co., Ltd. With the device of this publication also, no consideration is given to simplifying the operation of externally securing the encoder to the outer peripheral surface of the axially central portion of the hub.

SUMMARY OF THE INVENTION

An objective of the present invention is to provide a speed sensing rolling bearing unit and an assembly operation thereof, in view of the above situation, so that the operation of externally securing the encoder to the structural member of the inner ring assembly can be carried out easily in a non confined space.

DESCRIPTION OF THE PREFERRED EMBODIMENTS

Figure 7:
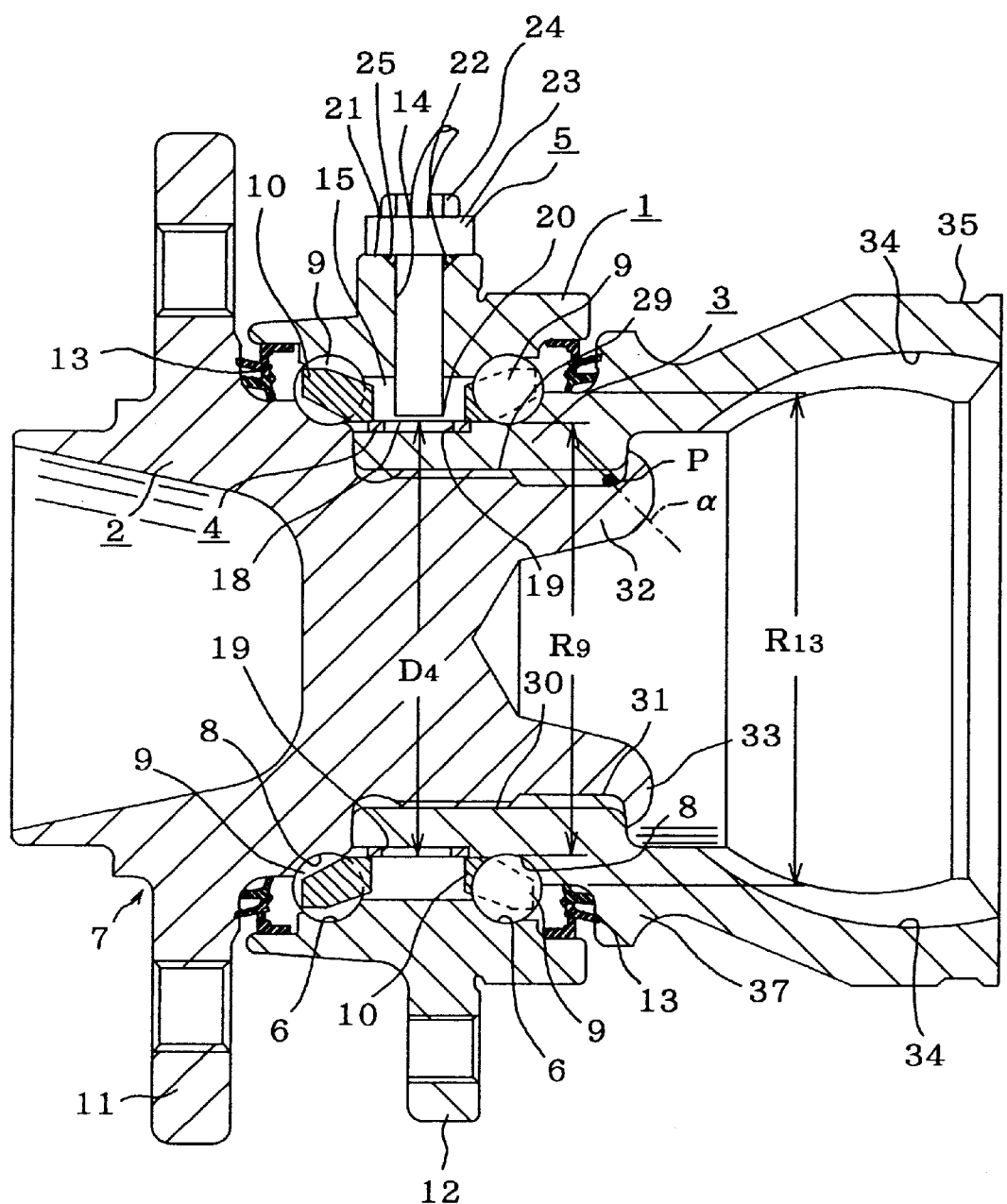
FIG. 7 is a cross sectional view of a third example of the embodiments of the present invention.
Figure 8:
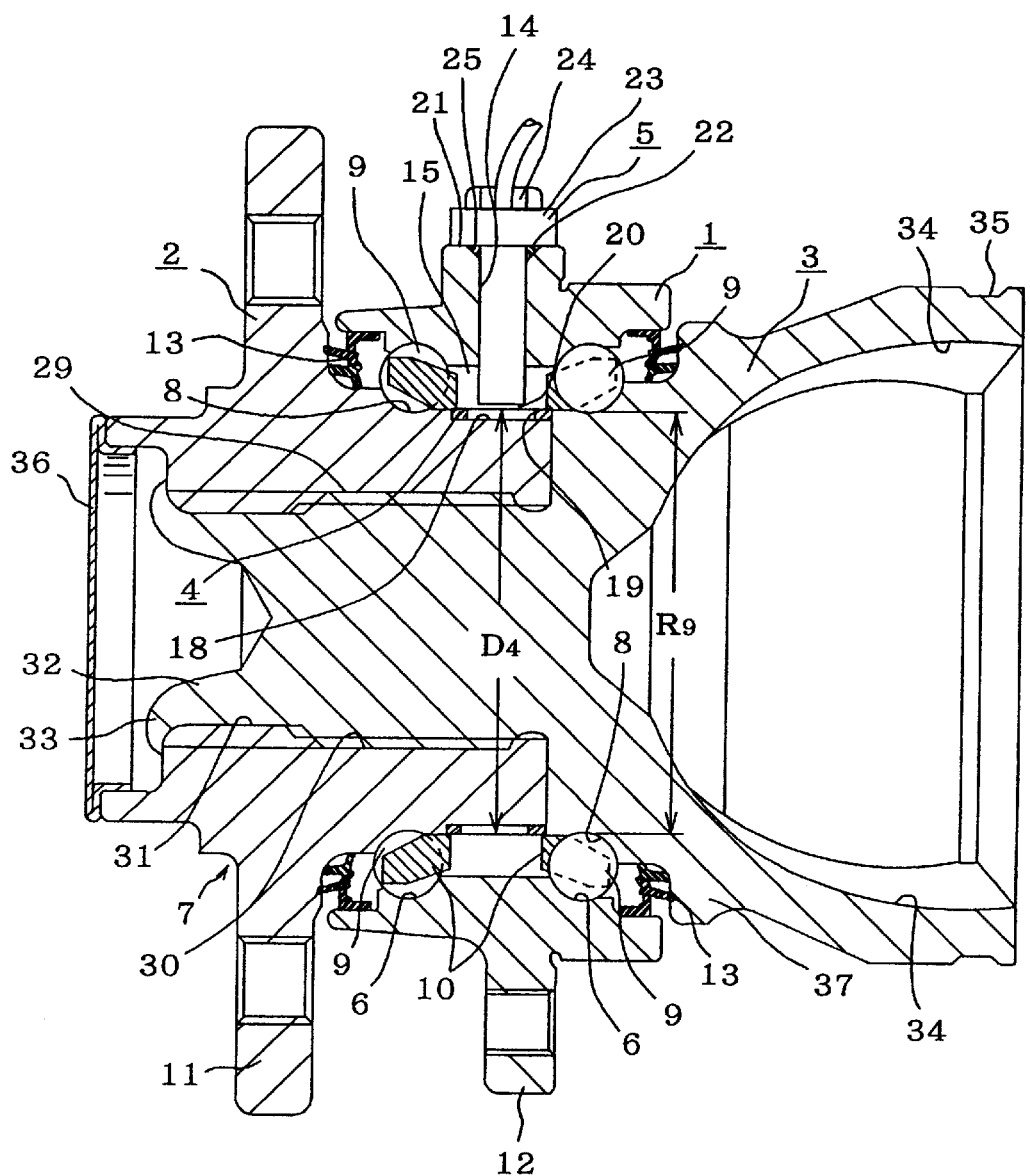
FIG. 8 is a cross sectional view of a fourth example of the embodiments of the present invention.
Figure 9:
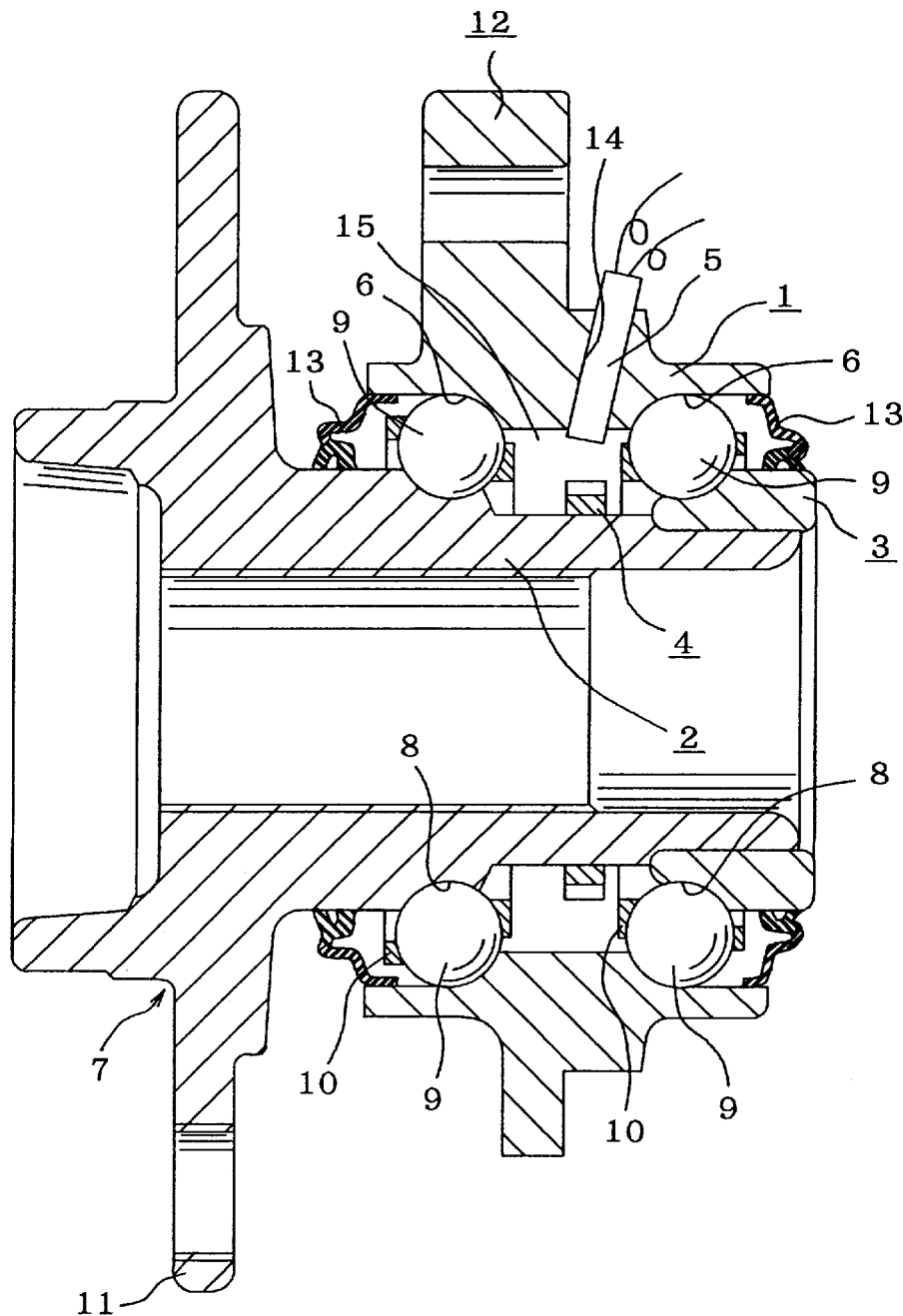
FIG. 9 is a cross sectional view of an example of the prior art structures.

FIGS. 1–4 show a first embodiment of the present invention. In the figures illustrating this embodiment of the invention, the inward-outward direction in FIGS. 1, 3 and 5, which show the widthwise direction of the vehicle in the left-right direction, is opposite to that in FIG. 9 showing the beforementioned conventional construction (the inward-outward direction in FIGS. 7 and 8 is the same as in FIG. 9). The speed sensing rolling bearing unit of the present invention, as with the conventional construction shown in FIG. 9, comprises an outer ring 1 which does not rotate during use, an inner ring assembly 7 comprising first and second inner rings, a plurality of rolling members 9, an encoder 4 and a sensor 5 supported on the outer ring 1, all of which are constructed in a similar manner as in FIG. 9.

The first inner ring is a hub 2, and the second inner ring is an inner ring 3. Both of these elements are rotatably supported inside the outer ring 1 to rotate during use. Furthermore, the rotational speed of the encoder 4 fixed to an outer peripheral surface of a central portion of the hub 2 is detected by the sensor 5. The inner ring 3 is externally secured to the hub 2 so as to constitute the inner ring assembly 7 together with the hub 2.

For this construction, double row outer ring raceways 6 are provided on the inner peripheral surface of the outer ring 1, and inner ring raceways 8 are respectively provided on the outer peripheral surface of the hub 2 and the inner ring 3 in a juxtaposed relation.

The rolling members 9 are retained by respective cages 10 and rotatably provided between the inner ring raceways 8 and the outer ring raceways 6, so that the inner ring assembly 7 is rotatably supported inside the outer ring 1.

A flange 11 for road wheel attachment is provided on an axially outer end portion (right end portion in FIG. 1) of the hub 2 which protrudes axially from the axially outer end portion of the outer ring 1. Furthermore, an attachment portion 12 for connecting the outer ring 1 to a suspension unit (not shown) is provided on the outer peripheral surface of an axially central portion of the outer ring 1. Gaps between the opening portions at the opposite ends of the outer ring 1 and the outer peripheral surface of the axially central portion of the hub 2 and the outer peripheral surface of the axially inner end portion (left end portion in FIG. 1) of the inner ring 3 are covered by respective seal rings 13.

It is also possible to use tapered rollers for the rolling members 9, and in this respect the construction is substantially the same as for the beforementioned conventional construction.

A smaller diameter step portion 16, on which the inner ring 3 is externally secured, is formed on the axially inner end portion of the hub 2, concentric with the hub 2. With the inner ring 3 externally secured by interference fitting onto this smaller diameter step portion 16, the axially inner end portion of the inner ring 3 protrudes axially inwards (leftwards in FIG. 1) from the axially inner end face (left end face in FIG. 1) of the hub 2. When fitted to a vehicle, the end face at the axially inner side of the inner ring 3, which protrudes axially inwards further than the hub 2 in this manner, abuts against a step face of a constant velocity joint (not shown in the figure).

The splined shaft (not shown) associated with the constant velocity joint is inserted into a spline bore 17 provided on the central portion of the hub 2. A nut (not shown in the figure) is threaded and tightened onto a male threaded portion provided on the tip end portion of the spline shaft at a portion protruding axially outwards from the axially outer end face of the hub 2. By tightening this nut, the step face of the constant velocity joint is pressed strongly against the end face at the axially inner side of inner ring 3 to thereby prevent the inner ring 3 from coming off the smaller diameter step portion 16.

A recess portion 18 of a diameter larger than that of the smaller diameter step portion 16 and smaller than that of the inner ring raceway 8 is formed at an axially central portion of the hub 2 concentric with the hub 2, around the periphery of the portion between the inner ring raceway 8 formed on the outer peripheral surface of the hub 2, and the smaller diameter step portion 16. The encoder 4 is externally secured by an interference fit to the recess portion 18. With the hub 2 and inner ring 3 assembled together to make up the inner ring assembly 7, the encoder 4 is located axially between the pair of inner ring raceways 8. The encoder 4 is formed generally in a cylindrical shape from a magnetic metal plate such as carbon steel plate with apertures 19 formed in an axially (left-right direction in FIGS. 1 and 3; front-rear direction in FIGS. 2 and 4) elongated slit shape at an axially central portion at even spacing around the circumferential direction, so that the magnetic characteristics change alternately and at even spacing in the circumferential direction. Two of the apertures 19 appear in FIG. 1.

With such an encoder 4 externally secured to the recess portion 18, an outer diameter $D_4$ of the encoder 4 is equal to or less than a diameter $R_9$ of the inscribing circle of the plurality of rolling members 9 located inside the respective outer ring raceways 6 (located in an annular form with one part of the rolling face in contact with the respective outer ring raceways 6). That is, $D_4 < R_9$. The diameter $R_9$ may be referred to as the bore diameter of the rolling member set.

The relationship between the outer diameter $D_4$ and the diameter $R_9$ is controlled in this way so that, with the encoder 4 already externally secured to the recess portion 18, the hub 2 can be inserted freely inside the outer ring 1 with the rolling members 9 already mounted thereon. Consequently, if, as with a typical rolling bearing unit, the diameter of the pitch circle of rolling members 9 provided in two rows is the same, then the outer diameter $D_4$ is smaller than the diameter $R_9$ of the inscribing circle of the two rows of rolling members 9. On the other hand, when the diameters of the pitch circles of the rolling members 9 provided in two rows are different from each other, then the outer diameter $D_4$ is made equal to or smaller than the diameter $R_9$ of the inscribing circle of the rolling members 9 of the row inside which the encoder 4 passes at the time of assembly (in the case of FIG. 1, the row on the right side).

A mounting hole 14 for communicating between the inner and outer peripheral surfaces of the outer ring 1 is formed at an axially central portion of the outer ring 1 at a location radially outward from the encoder 4. The sensor 5 is inserted and secured inside the mounting hole 14 so that a detecting portion provided on a tip end face (lower end face in FIGS. 1 and 3; left end face in FIGS. 2 and 4) of the sensor 5 faces the outer peripheral surface of the encoder 4 across a small gap 20 within a volume 15.

With the example shown in the figures, the mounting hole 14 is formed in a substantially horizontally aligned location, that is in a location substantially perpendicular to the direction in which gravity acts. The reason for this is to prevent a reduction in strength of the outer ring 1 which would occur if the mounting hole 14 were formed in the opposite vertical end portions of the outer ring 1 which receives a large bending moment due to the vehicle weight. In other words, the mounting hole 14 is provided at a substantially horizontally aligned location where a strength problem is unlikely to arise in order to maintain the necessary strength, even if the thickness of the outer ring 1 is not particularly great.

A flat mounting face 21, aligned perpendicular to the central axis of the mounting hole 14, is formed on the outer peripheral surface of the outer ring 1 on a portion around the radially outer end opening of the mounting hole 14. A chamfered portion 22 in the form of a conical recessed face is formed on the connecting portion between the flat mounting face 21 and the inner peripheral surface of mounting hole 14. An attachment portion 23 is integrally provided on a base end portion (upper end portion in FIG. 1; right end portion in FIG. 2) of the sensor 5. The attachment portion 23 is connected and secured to the outer ring 1 by a screw 24 which passes through a side portion of the attachment portion 23. In this condition, an O-ring 25, externally fitted to the base end portion of the sensor 5, is resiliently compressed against the chamfered portion 22, to thereby seal the portion where the sensor 5 is mounted, and prevent the ingress of foreign matter such as rain water passing into the outer ring 1 via the mounting hole 14.

In the abovementioned speed sensing rolling bearing unit, a road wheel secured to the flange 11 provided on the axially outer end portion of the hub 2, by studs 26 fixed to the flange 11, is rotatably supported relative to the suspension unit which supports the outer ring 1. Furthermore, when the encoder 4 which is externally secured to the recess portion 18 formed on the central portion of the hub 2 rotates together with rotation of the wheel, the apertures 19 and column portions between circumferentially adjacent apertures 19, provided on the axial central portion of the encoder 4, alternately pass near the detecting portion provided on the tip end face of the sensor 5. As a result, the density of the magnetic flux flowing in the sensor 5 changes so that the output from the sensor 5 changes. The frequency with which the output from the sensor 5 changes is proportional to the rotational speed of the wheel. Consequently, if the output from the sensor 5 is sent to a control unit (not shown in the figure), then an ABS or TCS can be appropriately controlled.

In particular, in the speed sensing rolling bearing unit of the present invention, the operation of assembling the speed sensing rolling bearing unit can be carried out with the encoder 4 already externally secured to the hub 2 which is a constituent member of the assembled inner ring assembly 7. That is to say, since the encoder 4 is already externally secured to the recess portion 18 of the hub 2 and the outer diameter $D_4$ of the encoder 4 is less than the diameter $R_9$ of the inscribing circle of the plurality of rolling members 9 disposed inside the outer ring raceways 6, the encoder 4 can pass inside the plurality of rolling members 9. In other words, the encoder 4 is inset into the midway portion oof the inner ring assembly. Consequently, the operation of externally securing the encoder 4 to the recess portion 18 can be carried out beforehand in a non confined space. Therefore, the operation of accurately securing the encoder 4 to the predetermined portion of the hub 2 can be carried out easily and reliably.

More specifically, in the speed sensing rolling bearing unit of the present invention, at first the plurality of rolling members 9 are mounted on the inner diameter side of one (the outer one; the rightward one in FIG. 2) of the double row outer ring raceways 6 provided in the inner peripheral surface of the outer ring 1. Furthermore, the encoder 4 is externally secured to the central portion of the hub 2 that forms the first inner ring. Since this external securing operation is carried out in a non confined space, the encoder 4 can be easily and accurately secured to a predetermined portion of the hub 2, as mentioned before. After mounting the rolling members 9 on the inner peripheral surface of the outer ring 1 in this way, and securing the encoder 4 to the outer peripheral surface of the central portion of the hub 2, the hub 2 is inserted into the inner diameter side of the outer ring 1 from the right side in FIG. 1 of the outer ring raceway 6 on which the plurality of rolling members 9 are mounted. The encoder 4 is then passed through the inner diameter side or bore diameter of the rolling members 9. After this, the plurality of rolling members 9 and the inner ring 3 (second inner ring) are mounted on the inner diameter side of the other one (the inner one; the left one in FIG. 2) of the double row outer ring raceways 6 provided on the inner peripheral surface of the outer ring 1.

Figure 1:
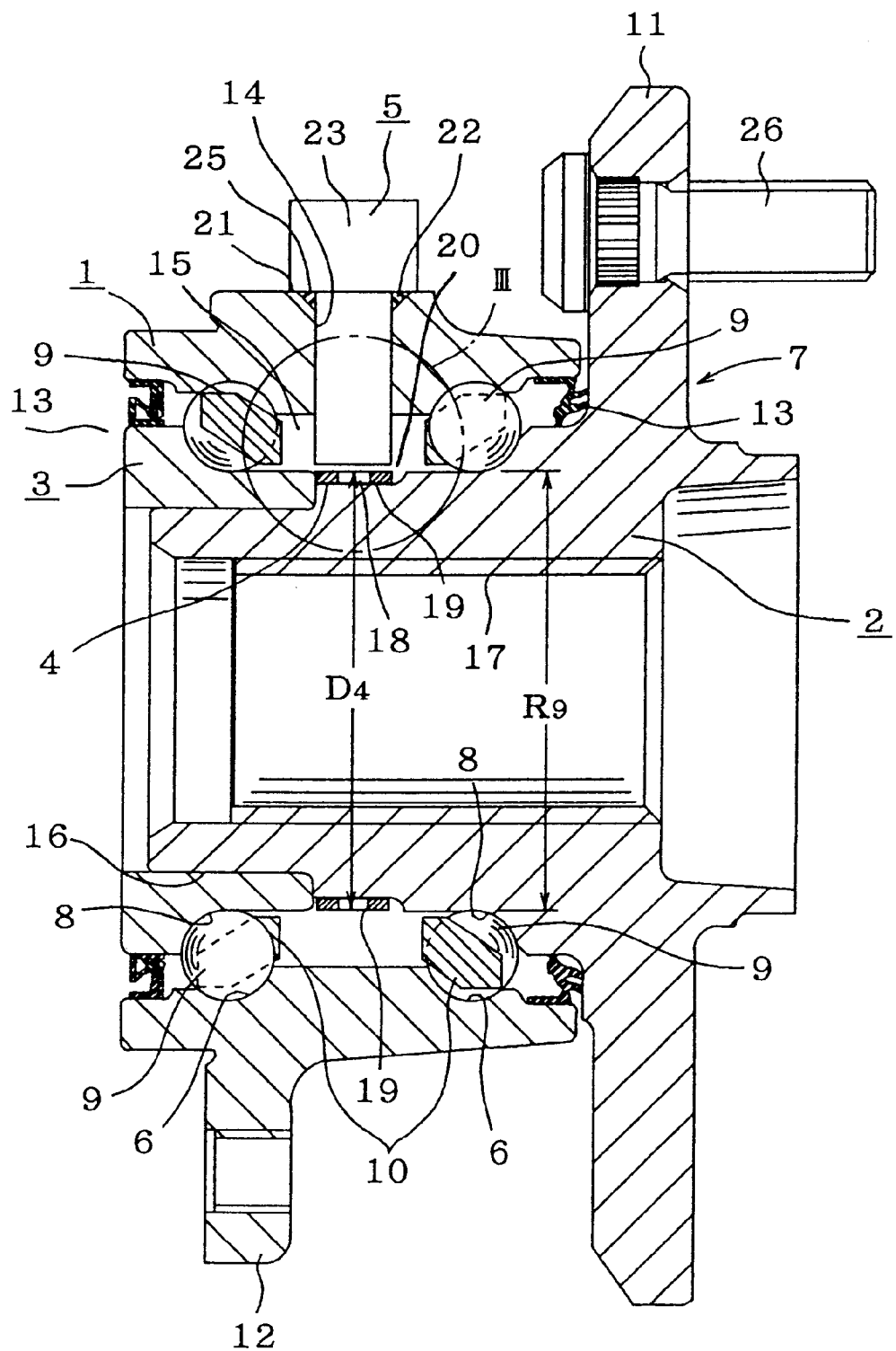
FIG. 1 is a cross sectional view taken along the line I—I in FIG. 2 showing a first example of the embodiments of the present invention.
Figure 2:
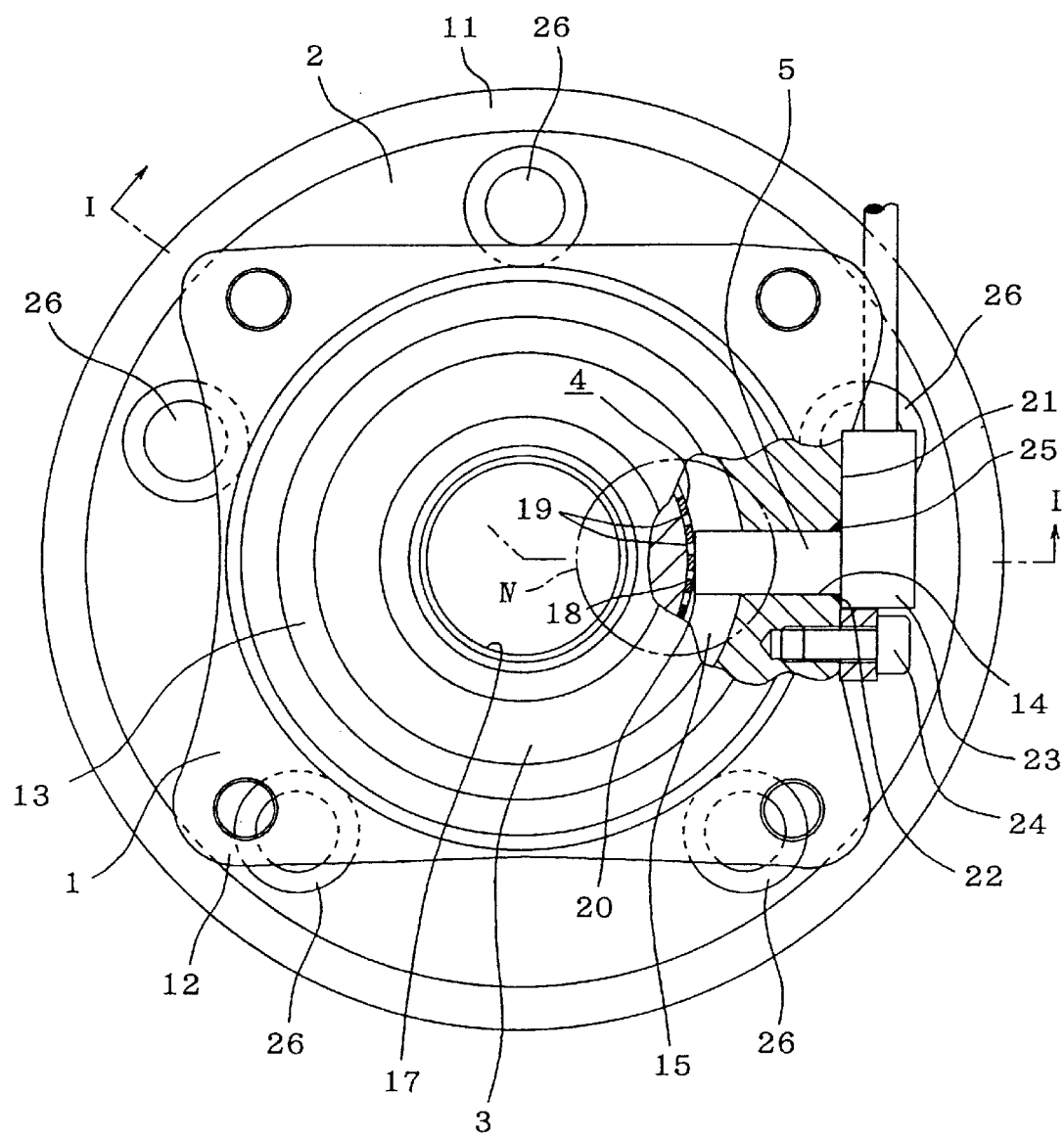
FIG. 2 is a partly cross-sectional right side elevational view of the example of FIG. 1.
Figure 3:
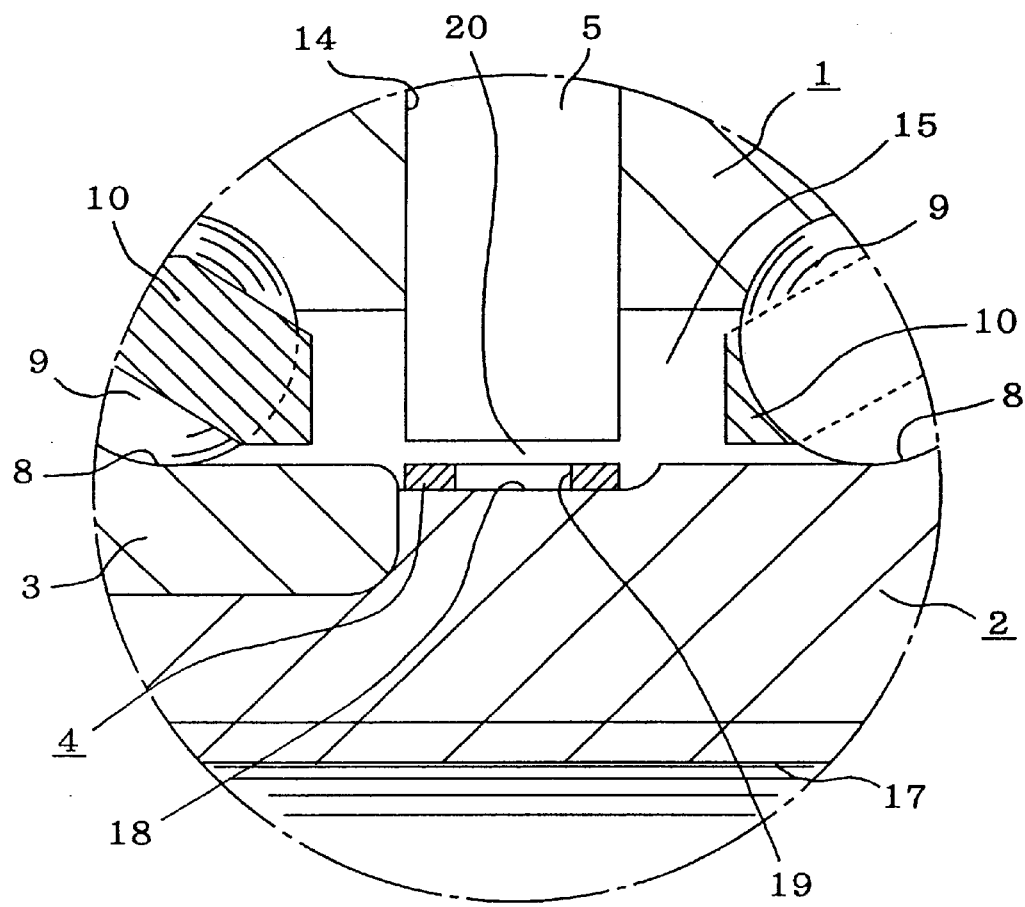
FIG. 3 is an enlarged cross-sectional view of portion III in FIG. 1.
Figure 4:
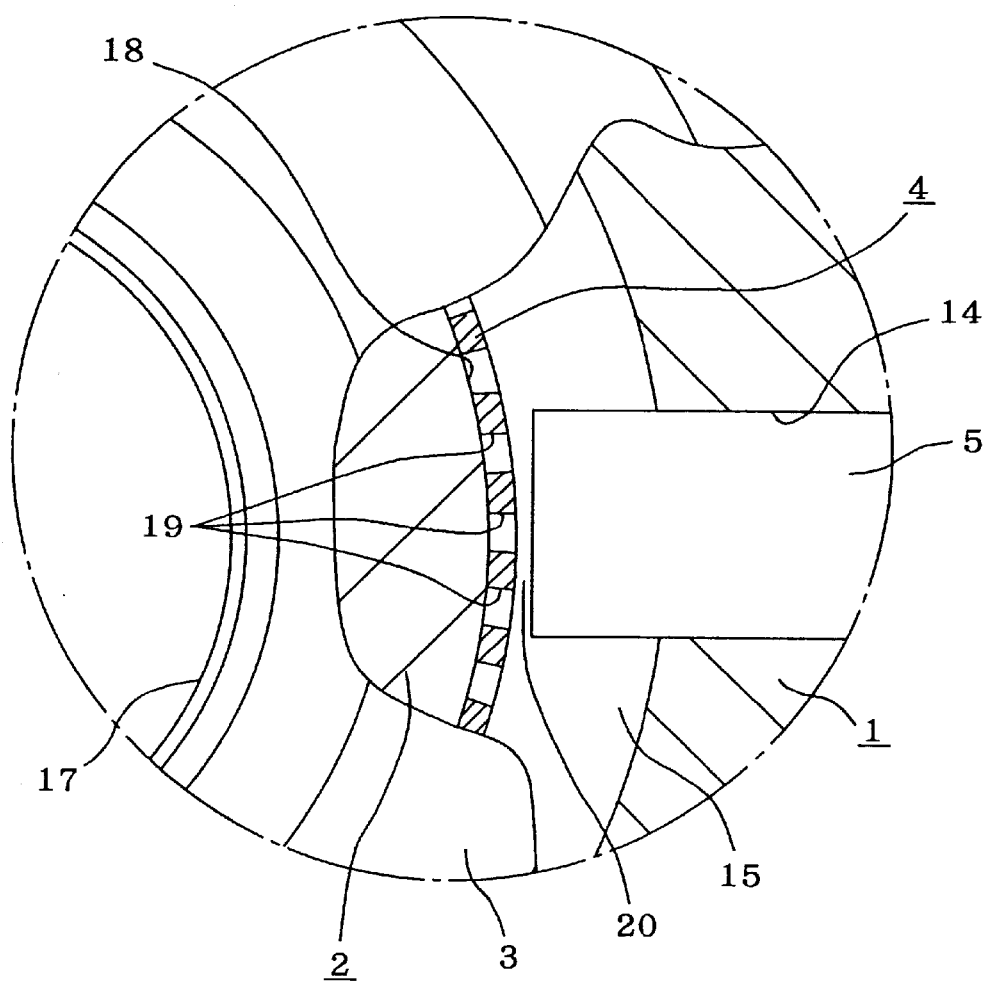
FIG. 4 is a partly cross-sectional enlarged side view of portion IV in FIG. 2.
Figure 5:
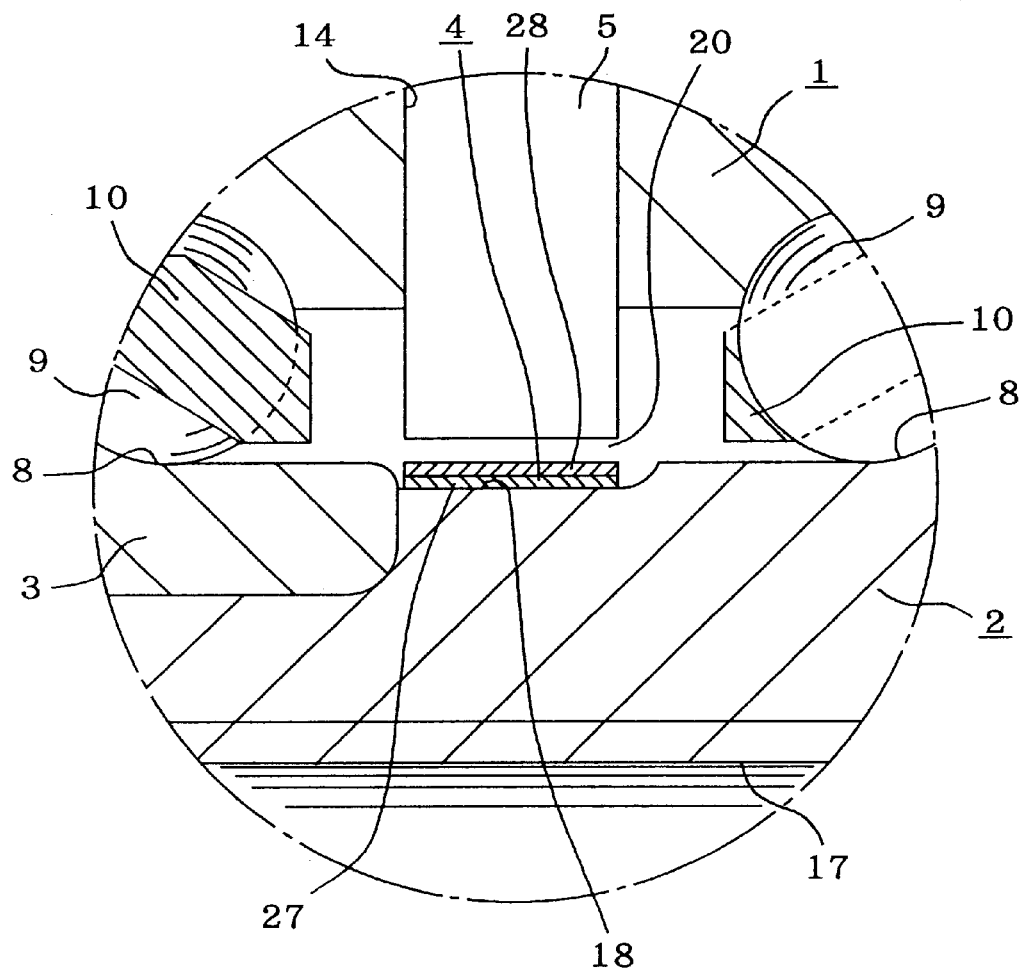
FIG. 5 is an enlarged view similar to FIG. 3 which shows a second example of the embodiments of the present invention.
Figure 6:
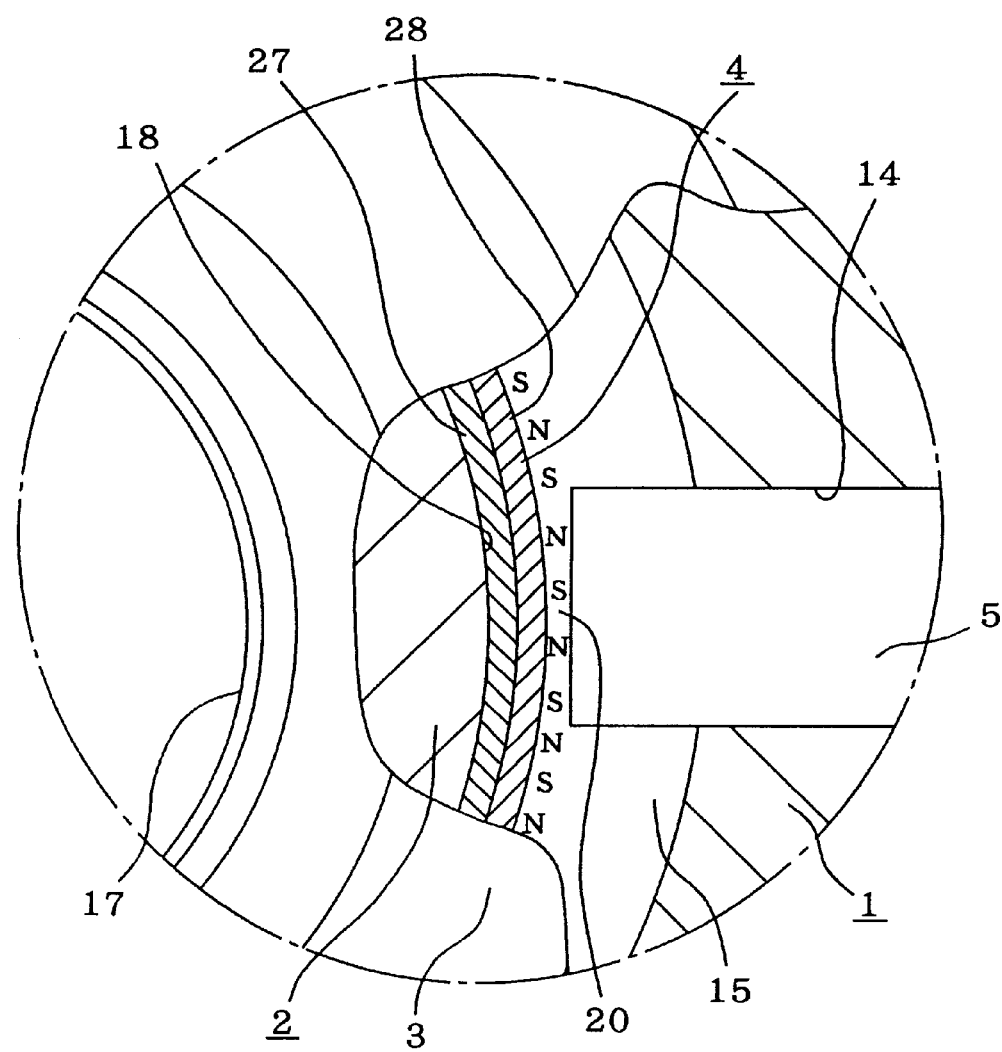
FIG. 6 is an enlarged view in the second example which is similar to FIG. 4.

FIGS. 5 and 6 show a second embodiment of the present invention. In this embodiment, a device in which an encoder body 28 is attached to an outer peripheral surface of a backing tube 27 is used for an encoder 4. This encoder body 28 is a permanent magnet such as a rubber magnet where powder of a ferro magnetic material, such as ferrite, is combined with a rubber and is magnetized in the radial direction. The magnetized direction changes alternately and at even spacing around the circumferential direction. Consequently, south poles and north poles on the outer peripheral surface of the encoder body 28 are located alternately and at even spacing. Such an encoder body 28 is attached to the outer peripheral surface of the backing tube 27 made of a magnetic material plate such as carbon steel. The encoder 4 is secured to the hub 2 by interference fitting the backing tube 27 over the recess portion 18 formed on the outer peripheral surface of the central portion of the hub 2. In this embodiment, since the outer diameter of the encoder body 28, that is the outer diameter of the encoder 4, is smaller than the diameter $R_9$ (refer to FIG. 1) of the inscribing circle of the plurality of rolling members 9, the operation of accurately securing the encoder 4 to a predetermined portion of the hub 2 can be carried out easily. The construction and operation, other than that due to the change in construction of the encoder 4, is substantially the same as for the case of the first embodiment.

FIG. 7 shows a third embodiment of the present invention. In this embodiment, a second inner ring 3 which, together with a hub 2 corresponding to the first inner ring, constitutes an inner ring assembly 7, comprises an outer ring of a constant velocity joint.

To make up the inner ring assembly 7 by connectedly fixing the hub 2 to the inner ring 3, a male spline 29 is formed on the outer peripheral surface of the hub 2 on an axially inner portion in the axially central portion, and a female spline 30 is formed on the inner peripheral surface of the axially outer end portion (left end portion in FIG. 7) of the inner ring 3. In addition, a cylindrical portion 32 is formed on the axially inner end portion (right end portion in FIG. 7) of the hub 2.

At the time of connectedly fixing the hub 2 to the inner ring 3, at first the male spline 29 and the female spline 30 are engaged with each other, and a small diameter portion 31, formed on the inner peripheral surface of a central portion of the inner ring 3, is engaged with a minimum of play with a base end portion of the cylindrical portion 32. The small diameter portion 31 and the outer peripheral surface of the base end portion of the cylindrical portion 32 are precision finished by grinding. Consequently, the matching and engagement ensures that the hub 2 and the inner ring 3 are assembled concentrically and cannot rotate relative to each other. Since the hub 2 and the inner ring 3 are engaged together with a spline, a large torque can be transmitted. With the hub 2 and the inner ring 3 assembled together in this manner, a portion at the tip end portion (right end portion in FIG. 7) of the cylindrical portion 32 protruding axially inwards from the small diameter portion 31 of the inner ring 3 is crimped radially outwards to give a crimped portion 33. This crimped portion 33 presses against the side face on the axially inside of the small diameter portion 31 of the inner ring 3. In this condition, the hub 2 and inner ring 3 are inseparably connected, thus making up the inner ring assembly 7.

If the machining of the inner peripheral surface of inner ring 3 is carried out by broaching along the full axial length, then the machining operation is relatively simple. Moreover, at the time of this machining, after forming the female spline grooves including the small diameter portion 31, the inner diameter of the female spline portion 30 for engagement with the male spline 29 can be made larger than the inner diameter of the small diameter portion 31. When this machining is carried out on the inner peripheral surface of inner ring 3, the inner peripheral surface of the small diameter portion 31 becomes the tooth tip circle of the female spline groove. Consequently, the engagement face between the inner peripheral surface of the small diameter portion 31 and outer peripheral surface of the cylindrical portion 32 is not continuous in the circumferential direction, instead being intermittent. Moreover, with the inner ring 3 and the hub 2 simply assembled without formation of the crimped portion 33, even if a small gap exists between the small diameter portion 31 and the outer peripheral surface of the base end of the cylindrical portion 32, when the tip end portion of the cylindrical portion 32 is radially enlarged to form the crimped portion 33, the diameter of the cylindrical portion 32 is increased. Therefore, the small gap will disappear and the engagement condition between the small diameter portion 31 and the cylindrical portion 32 can be made secure by interference fitting.

A mount recess portion 18 for external engagement with the encoder 4 is formed on the outer peripheral surface of the axially outer end portion of inner ring 3. A detecting portion located on a tip end face of a sensor 5, which is inserted in a mounting hole 14 provided in the outer ring 1, faces the outer peripheral surface of the encoder 4 externally secured to the recess portion 18, across a small gap 20. Ball grooves 34 for guiding the balls (not shown in the figure) of the constant velocity joint are formed on the inner peripheral surface of the inner ring 3, while an engagement groove 35 for engaging with an end portion of a protective boot (not shown in the figures) is formed on the outer peripheral surface of the axially inner end portion of the inner ring 3.

In the construction of the present embodiment as described above, it is necessary to locate the rolling members 9 beforehand inside the outer ring raceways 6 formed on the inner peripheral surface of the outer ring 1, and internally secure seal rings 13 beforehand to the opposite end portions of the inner peripheral face of the outer ring 1. In other words, assembly of the rolling members 9 and the seal rings 13 is not possible once the inner ring assembly 7 has been installed inside of the outer ring 1. However, in the present embodiment, since the outer diameter $D_4$ of the encoder 4 is made smaller than the diameter $R_9$ of the inscribing circle of the rolling members 9 and smaller than the inner diameter $R_{13}$ of the seal rings 13 ($D_4<R_9<R_{13}$), the hub 2 and inner ring 3, with the encoder 4 already externally fitted thereto, can be inserted inside the outer ring 1 in the later step, and then connectedly secured together. In this way, in this embodiment also, since the outer diameter $D_4$ of the encoder 4 is made smaller than the diameter $R_9$ of the inscribing circle of the plurality of rolling members 9 and smaller than the inner diameter $R_{13}$ of the seal rings 13, the operation of accurately securing the encoder 4 at a predetermined position on the inner ring 3 can be easily carried out. Other details of the construction and operation are substantially the same as those of the first embodiment.

With the construction of this embodiment, the protective boot fitted to the constant velocity joint also serves the function of preventing the ingress of foreign matter sucll as rain water to the spline engagement portion, and hence a special water prevention cap for the spline engagement portion is not necessary. Moreover, with the hub 2, the inner ring raceways 8 and the portion of male spline 29 are subjected to a quench hardening process, such as induction hardening, and the step portion, which abuts against the end face of inner ring 3 and which is subjected to a large load at the time of the crimping process, is also subjected to the quench hardening process. Furthermore, with the inner ring 3, the ball grooves 34 and the female spline 30 of the constant velocity joint are subjected to a quench hardening process, and the end face which abuts against the step portion of the hub 2 and the inside face of the small diameter portion 31 where the material of the crimped portion 33 is deformed, which are both subjected to a large load at the time of the crimping process, are also subjected to the abovementioned quench hardening process.

A flange portion 37 is formed on the inner ring 3 for sliding contact with the seal lip of the inside seal ring 13, and the outer peripheral rim of the flange portion 37 is made close to the axially inner end face of the outer ring 1 to thus form a labyrinth seal for preventing the ingress of foreign matter such as rain water.

Furthermore, the dimensions of the attachment portions for the seal rings 13 and the portions in sliding contact with the seal lips of the seal rings 13 are controlled in order to use the same item for the inside seal ring 13 as for the seal ring 13 on the axially outer side to increase the number of identical mass produced parts and to simplify parts control, thereby reducing the cost of the seal rings.

Moreover, the design is such that a contact point P of an extension line α of the contact angle of the inside rolling members 9 and the outer peripheral surface of the cylindrical portion 32 provided on the hub 2 is placed at the base end portion (or the portion of male spline 29) of the cylindrical portion 32 which is not crimped outward in the radial direction. Hence, a large load is not applied from the rolling members 9 on the inside to the crimped portion 33 which, from a processing point of view, is difficult to make thick.

FIG. 8 shows a fourth embodiment of the present invention. This embodiment is opposite to the abovementioned third embodiment in that a female spline 30 is formed on the side of a hub 2 corresponding to the first inner ring provided with a flange 11 for securing a road wheel, and a male spline 29 is formed on the side of an inner ring 3 corresponding to the second inner ring and serving also as the outer ring of a constant velocity joint. Accordingly, a cylindrical portion 32 forming a crimped portion 33 on a tip portion thereof is provided on the side of the inner ring 3, while a small diameter portion 31 which is closely fitted to the outer peripheral surface of the base end portion (right end portion in FIG. 8) of the cylindrical portion 32 is provided on the inner peripheral surface side of the hub 2.

In this embodiment, the small diameter portion 31, the end face of which is pressed by the crimped portion 33, is provided on the inner peripheral surface side of the hub 2. Hence, with the omission of the small diameter portion 31 (FIG. 7) from the inner peripheral surface of the inner ring 3, the axial dimensions of the inner ring 3 can be shortened. As a result, the overall length of the rolling bearing unit including the inner ring 3 is shortened, enabling a size and weight reduction. The crimped portion 33, and the engagement portion of the male spline 29 and the female spline 30 continuous from the crimped portion 33, are exposed to the opening at the axially outer end of the rolling bearing unit. Hence, a cover 36 is engaged and secured to the open portion of the axially outer end (left end in FIG. 8) of the hub 2 to prevent the ingress of foreign matter such as rain water to inside the hub 2. In the abovementioned third embodiment, such a cover 36 was not necessary. Other details of the construction and operation are substantially the same as those of the third embodiment.

The respective embodiments shown in the drawings have been given for the case where the present invention is applied to a rolling bearing unit for supporting a driven wheel (a rear wheel of FR and RR vehicles, a front wheel of a FF vehicle, and all wheels of FR and RR vehicles). However, the present invention can also be applied to a rolling bearing unit for supporting a non-driven wheel (a rear wheel of a FF vehicle, and a front wheel of FR and RR vehicles). Furthermore, according to the present invention, in order to both improve the accuracy in assembling an encoder and simplify the assembly operation, the outer diameter of the encoder is controlled by the relation with the diameter of the inscribing circle of the rolling members. The construction of the rotational speed sensing unit has no particular limitations. Consequently, the rotational speed sensing unit is not limited to a magnetic sensing type as shown in the respective embodiments in the figures; other devices such as eddy current types and optoelectrical types of sensing units may be used.

With the present invention constructed and operated as described above, since the assembly operation is simplified, making it easy to ensure accuracy in assembling the encoder, a low cost speed sensing rolling bearing unit, which can achieve highly accurate rotational speed sensing, can be realized.

What is claimed:

1. A rolling bearing unit with a rotational speed sensor comprising:

a stationary outer ring having an inner peripheral surface formed with outer ring raceways in double rows, and a mount hole in an axially intermediate portion thereof, a rotatable inner ring assembly comprising a first inner ring having an outer peripheral surface formed with a first inner ring raceway and a second inner ring having an outer peripheral surface formed with a second inner ring raceway, a plurality of rolling members provided between the first and second inner ring raceways and the outer ring raceways to define a set bore diameter, respectively, an encoder having a detected portion having characteristics changing alternately with a uniform interval in a circumferential direction and fixed concentrically with the inner ring assembly at a portion on the inner ring assembly axially between the first and second inner ring raceways, the detected portion having an outer peripheral surface portion, and a sensor for producing an output signal, having a detecting portion and supported within the mount hole with the detecting portion opposed to the outer peripheral surface portion of the detected portion of the encoder, wherein the output signal of the sensor changes as the characteristics of the detected portion alternately change, and wherein the encoder has an outer diameter which is smaller than the set bore diameter defined by the rolling members in the row through which the encoder passes during assembly.

2. A rolling bearing unit with a rotational speed sensor comprising:

a stationary outer ring having an inner peripheral surface formed with outer ring raceways in double rows, and a mount hole in an axially intermediate portion thereof, a rotatable inner ring assembly comprising a first inner ring having an outer peripheral surface formed with a first inner ring raceway and a second inner ring having an outer peripheral surface formed with a second inner ring raceway, a plurality of rolling members arranged between the first and second inner ring raceways and the outer ring raceways to provide a rolling member set bore diameter, respectively, an encoder having a detected portion having characteristics changing alternately with a uniform interval in a circumferential direction and fixed concentrically with the inner ring assembly at a portion on the inner ring assembly axially between the first and second inner ring raceways, and a sensor for producing an output signal, having a detecting portion and supported within the mount hole with the detecting portion opposed to the outer peripheral surface portion of the detected portion of the encoder, wherein the output signal of the sensor changes as the characteristics of the detected portion alternately change, and wherein the encoder has an outer diameter which is smaller than said rolling member set diameter.

* * * * *